United States Patent [19]

Brulé et al.

[11] Patent Number: 4,995,170
[45] Date of Patent: Feb. 26, 1991

[54] CONTOUR READING DEVICE SUITABLE FOR USE ON EYEGLASS FRAMES

[75] Inventors: Francois Brulé, Sevran; Alain Chansavoir, Luzancy, both of France

[73] Assignee: Essilor International Cie General d'Optique, Creteil Cedex, France

[21] Appl. No.: 503,102

[22] Filed: Apr. 2, 1990

Related U.S. Application Data

[63] Continuation of Ser. No. 187,010, Apr. 27, 1988, abandoned.

[30] Foreign Application Priority Data

Apr. 28, 1987 [FR] France ............... 87 06021

[51] Int. Cl.[5] ............................................. G01B 7/28
[52] U.S. Cl. ...................................... 33/551; 33/1 M; 33/503; 33/200
[58] Field of Search ................ 33/200, 1 M, 503, 507, 33/544, 543, 546, 551, 553, 554, 556, 558, 559, 561; 351/204; 51/101 LG, 105 LG, 127

[56] References Cited

U.S. PATENT DOCUMENTS

| | | | |
|---|---|---|---|
| 3,555,739 | 1/1971 | Novak | 51/101 LG |
| 3,786,600 | 1/1974 | Bloxsom | 51/101 |
| 3,857,185 | 12/1974 | Hoglund | 33/553 |
| 4,051,601 | 10/1977 | Godot | 33/200 |
| 4,084,323 | 4/1978 | McMurtry | 33/561 |
| 4,646,566 | 3/1987 | Hofler | 33/179.5 R |

FOREIGN PATENT DOCUMENTS

| | | | |
|---|---|---|---|
| 0181788 | 5/1986 | European Pat. Off. | |
| 2600277 | 12/1987 | France | |
| 223013 | 12/1983 | Japan | 33/559 |

Primary Examiner—Harry N. Haroian
Attorney, Agent, or Firm—Charles E. Brown; Charles A. Brown

[57] ABSTRACT

A device for reading contours, as of eyeglass frames, comprises a feeler adapted to be applied to an article in order to read its contour. A carriage supports the feeler and is movable to-and-fro on a guide. A drive motor moves the carriage on the guide. A floating mounting is disposed between the feeler and the drive motor.

20 Claims, 3 Drawing Sheets

CONTOUR READING DEVICE SUITABLE FOR USE ON EYEGLASS FRAMES

This application is a continuation of application Ser. No. 187,010, filed 4/27/88 now abandoned.

BACKGROUND OF THE INVENTION

1. Field of the Invention

The present invention is generally concerned with contour reading devices adapted to "read" any shape and it is more particularly directed to the case where it is a question of establishing the specific contour of the rings or surrounds of an eyeglass frame in order to trim ophthalmic lenses to be fitted into the frame.

2. Description of the Prior Art

Generally speaking, the contour reading devices usually employed to this end comprise a carriage which, carrying a feeler designed to be applied to the article whose contour is to be read and thus in this instance adapted to be applied against the bottom of the bezel of the ring or surround of the eyeglass frame concerned, is able to move relative to the eyeglass frame in a system of polar or Cartesian coordinates, for example.

In European patent application No 0 181 788, for example, in an arrangement that is known in itself, the carriage is mounted for passive to-and-fro movement on a guide, controlled by a simple return spring.

There are two particular problems to be overcome in producing contour reading devices of this type.

The first concerns the fact that, although it has to be able to move, the carriage has to apply the feeler that it carries against the ring or surround of the eyeglass frame concerned with a controlled and strictly defined force, failing which the feeler could deform the ring or surround and compromise the accuracy of the measurement.

The second concerns the fact that when the ring or surround concerned comprises localized areas where the curvature varies quickly, as is the case with half-moon or water droplet shape ophthalmic lenses, for example, it is not rare for the feeler to become jammed in such areas.

A general object of the present invention is an arrangement whereby these problems can be overcome.

SUMMARY OF THE INVENTION

The present invention consists in a device for reading contours, as of eyeglass frames, comprising a feeler adapted to be applied to an article to read its contour, a first carriage supporting said feeler, a first guide on which said carriage is movable to-and-fro, a first drive motor adapted to move said first carriage on said first guide and a first floating mounting disposed between said feeler and said first drive motor.

Thanks to the inventive floating relationship between the feeler and the drive motor by which it is moved, the force with which the feeler bears against the article to be read can be controlled precisely.

In practice, this floating mounting uses spring means through the intermediary of which thrust is applied by the drive motor to the feeler, so that all that is required is to choose the spring means appropriately and to control the drive motor in a corresponding way.

For example, in one practical embodiment said first drive motor is an electric motor and is operative on said feeler through the intermediary of said first auxiliary carriage and is adapted to be supplied with electrical power subject to the condition of said first sensing means and said first floating mounting is operative between said first auxiliary carriage and said first carriage.

As the feeler moves in contact with the article whose contour is to be read, if the relative displacement permitted by the floating mounting should reach a value for which the force with which the feeler is applied to the article reaches its maximum permissible value, then the electrical supply to the drive motor is cut off.

In one embodiment that is particularly simple and economical, the auxiliary carriage constitutes a first body which is suspended from a second body carried by the "Y" carriage by spring means providing the corresponding floating mounting.

Thus where at least the auxiliary carriage is concerned, the term "carriage" must be understood in a wide sense, not necessarily implying positive guidance by any form of guide.

Of course, positive guidance of the auxiliary carriage is a viable alternative, as with the "Y" carriage with which it is associated.

In any event, in this specific embodiment it is the auxiliary carriage which carries the feeler.

The advantageous result of this is that the corresponding floating mounting is implemented as close as possible to the feeler.

It is therefore concerned only with the relatively moderate mass of the auxiliary carriage and the feeler and is not affected in any way by the much greater mass of the other components employed.

This has a two-fold advantage.

First of all, it is advantageously possible to make do with relatively low stiffness of the spring means employed, which guarantees high accuracy in respect of the maximum permissible force with which the feeler is applied to the article whose contour is to be read, and a relatively high rate of advance for the "Y" carriage carrying the assembly, which reduces commensurately the time needed to read the entire contour, although these two requirements for precision and speed of execution are normally contradictory.

Also, this arrangement advantageously minimizes the effect of gravity on the functioning of the system so that the latter may be inclined to the horizontal in an ergonomic way, facilitating its use.

For movement of the feeler in a system of Cartesian coordinates, which is preferred, the guide for the "Y" carriage of the contour reading device in accordance with the invention is advantageously carried by a second carriage, referred to hereinafter for convenience as the "X" carriage, which is moved to-and-fro by a drive motor on a guide orthogonal to the previous guide, there being a floating mounting of a similar type to that of the "Y" carriage between the "X" carriage drive motor and the feeler.

The overall result is that a great quantity of information is available at all times and that, in various possible practical implementations that might be considered, it is possible to control the feeler in an appropriate way irrespective of the contour of the ring or surround of the eyeglass frame to which it is applied, without any risk of the feeler jamming or any risk of the ring or surround being deformed.

To the contrary, experience shows that it is possible in this way to obtain a particularly satisfactory equilibrium between the various forces operative at the level of the feeler at all times.

The characteristics and advantages of the invention will emerge from the following description given by way of example only with reference to the appended schematic drawings.

DESCRIPTION OF THE PREFERRED EMBODIMENTS

The drawings show by way of example the application of the invention to reading the contour of one or other of the rings or surrounds 10 of any eyeglass frame 11.

Figure 3:
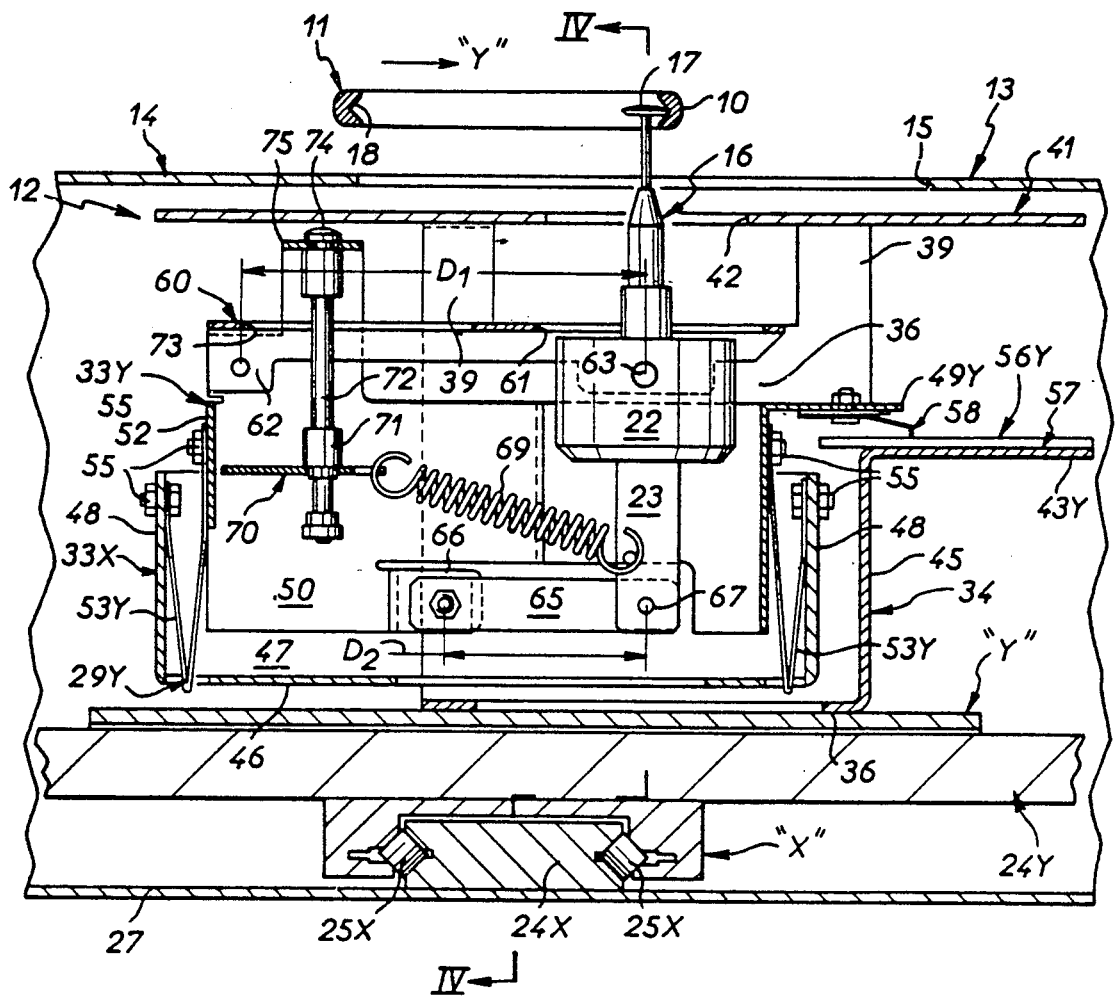
FIG. 3 is a partial view of the contour reading device to a still larger scale and in longitudinal cross-section on the line III—III in FIG. 2.

In a way that is known in itself, the contour reading device 12 employed to this end comprises, in any kind of housing 13 on the front plate 14 of which the eyeglass frame 11 concerned is placed, a feeler 16 which projects from said housing 13 through a wide opening 15 in the front plate 14 and is designed to be applied from the inside against the ring or surround 10 whose contour is to be read. It comprises for this purpose a head 17 adapted to bear against the bezel 18 that a ring or surround 10 of this kind usually comprises (FIG. 3).

Figure 1:
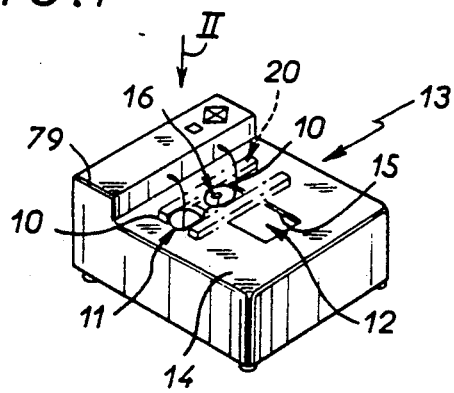
FIG. 1 is a perspective view of a contour reading device in accordance with the invention.
Figure 2:
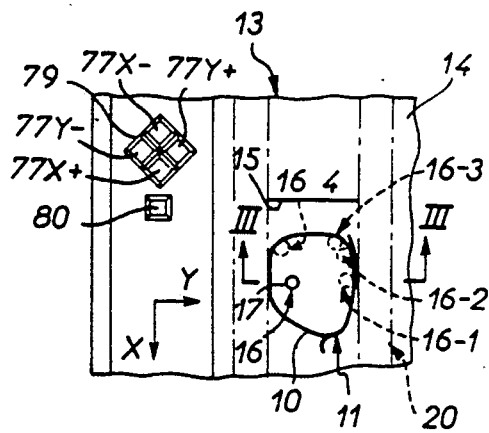
FIG. 2 is a partial plan view of it in the direction of the arrow II in FIG. 1, to a larger scale.

Of course, and as schematically represented in FIGS. 1 and 2 in chain-dotted outline, the front plate 14 of the housing 13 is provided with holding means 20 adapted to fix an eyeglass frame 11 to it in a removable way.

As they do not of themselves constitute any part of the present invention, these holding means 20 will not be described here.

The same goes for the housing 13, the implementation of which will be obvious to those skilled in the art.

The feeler 16 will not be described in detail either, as it also does not of itself constitute any part of the present invention.

Suffice to say that the feeler 16 is carried by a rotary encoder 22 adapted to sense its rotation and thus to measure the perimeter of the contour over which it travels and that the encoder 22 has a tail 23 on the side opposite the feeler 16 but aligned with it.

To support the feeler 16 the contour reading device 12 in accordance with the invention comprises a first carriage, referred to hereinafter for convenience as the "Y" carriage, and so designated in the figures. It is mounted to move to-and-fro on a straight guide 24Y.

Figure 4:
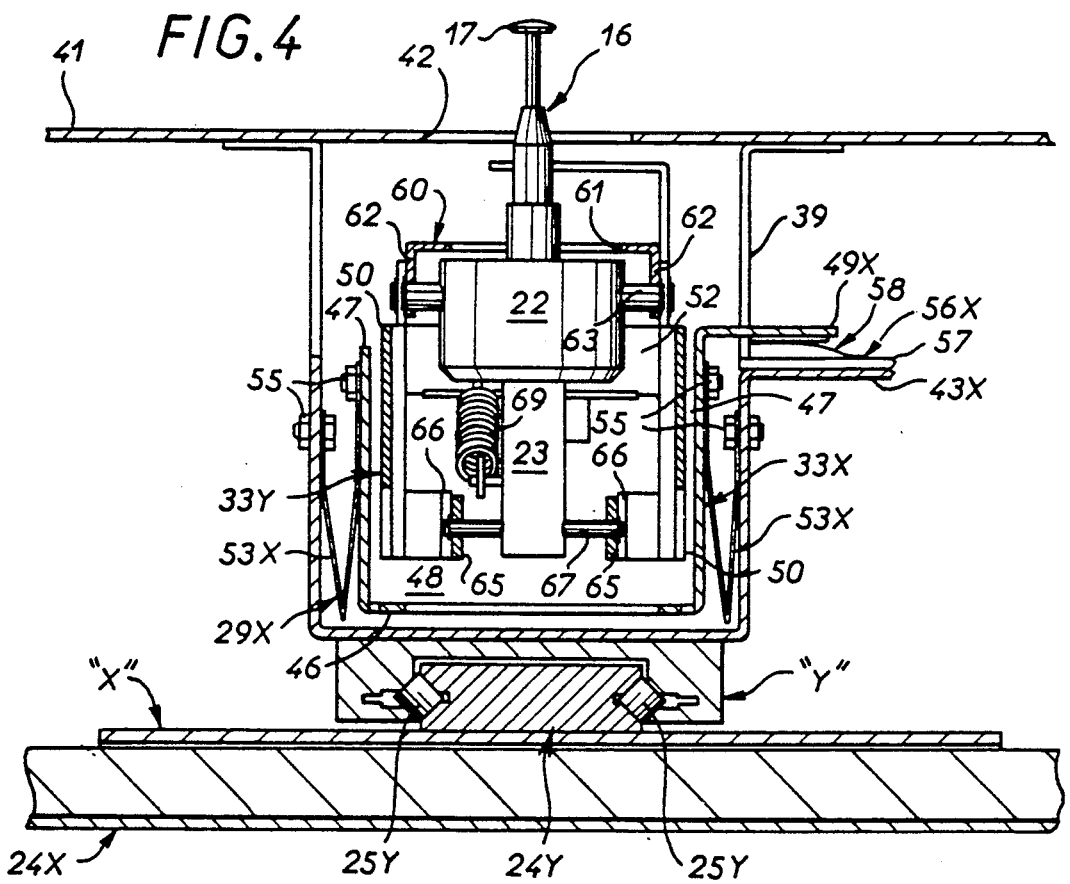
FIG. 4 is a partial view of it in transverse cross-section on the broken line IV—IV in FIG. 3.

Between the "Y" carriage and its guide 24Y, on each side of the latter, are crossed roller bearings 25Y (FIG. 4).

To read a contour in Cartesian coordinates the guide 24Y of the "Y" carriage is carried by a second carriage, referred to hereinafter for convenience as the "X" carriage, which is mounted to move to-and-fro on a straight guide 24X orthogonal to the guide 24Y, by means of crossed roller bearings 25X on either side of the guide (FIG. 3).

The combination constitutes an XY mobile table.

In the embodiment shown in FIGS. 1 through 6, the contour reading device 12 in accordance with the invention as a whole is carried by the guide 24X of its "X" carriage, which guide 24X is at the bottom and attached to the base 27 of the housing 13.

The front plate 14 of the housing 13 is parallel to the base 27 so that the entire system is substantially horizontal.

The "Y" carriage is moved to-and-fro on its guide 24Y by a drive motor 28Y and a floating mounting 29Y is used between the feeler 16 and the drive motor 28Y, as will be described in more detail later (FIG. 3).

Likewise, the "X" carriage is mounted to be moved to-and-fro on its guide 24X by a drive motor 28X and a similar type floating mounting 29X is used between the drive motor 28X and the feeler 16 (FIG. 4).

Figure 5:
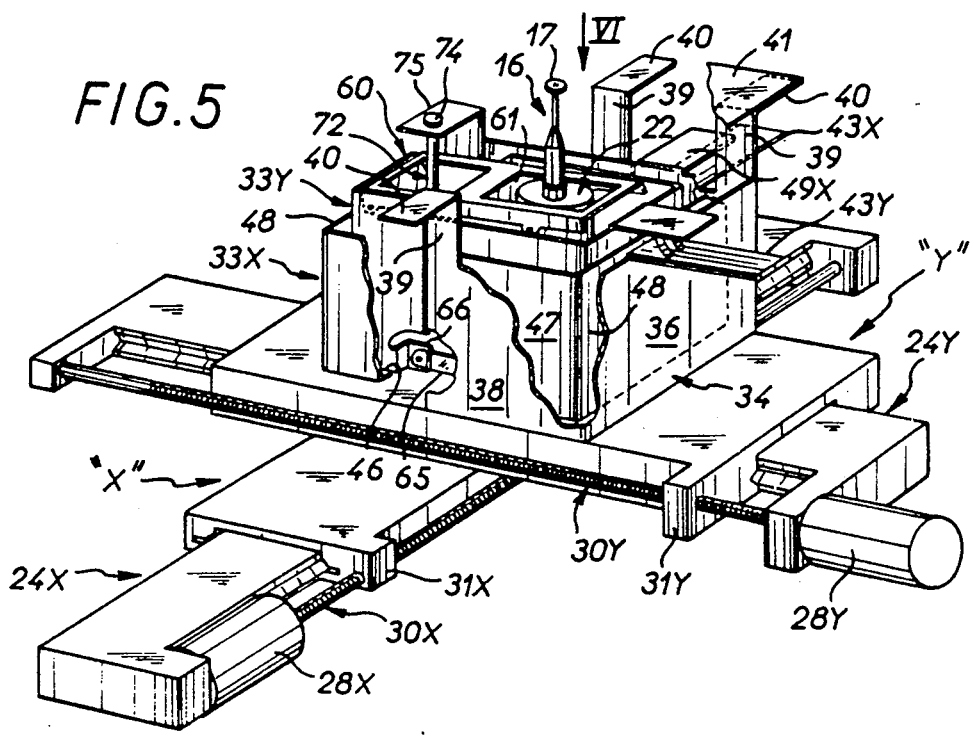
FIG. 5 is a partially cut away perspective view of the main component parts of the contour reading device, to a different scale.
Figure 6:
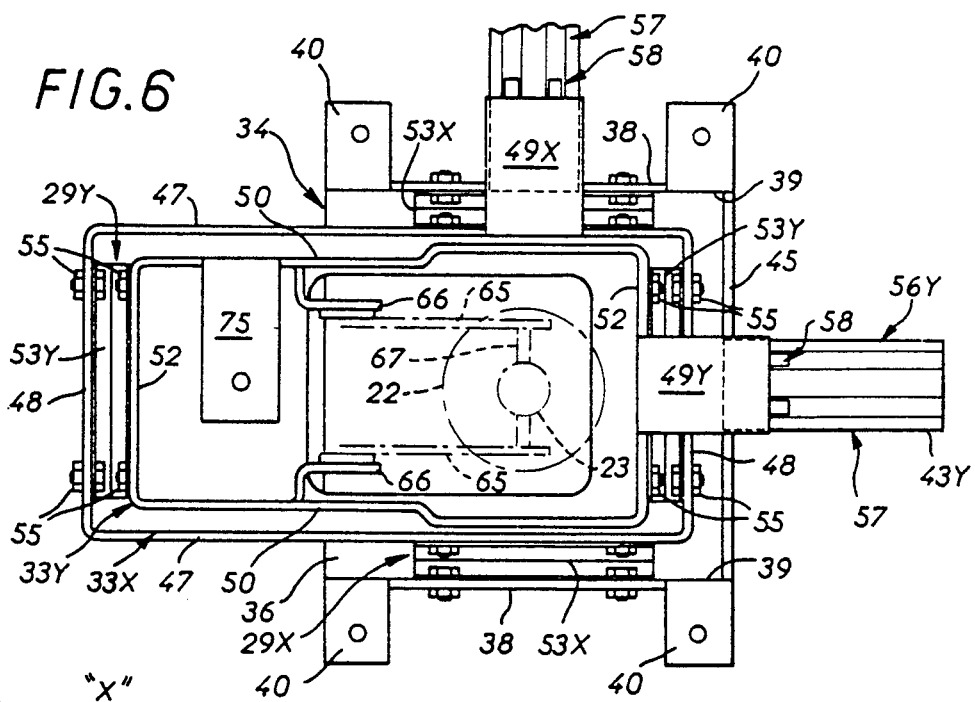
FIG. 6 is a plan view as seen in the direction of the arrow VI in FIG. 5 showing the component parts more relevant to the floating mounting that characterises this contour reading device.

Referring to FIG. 5, the drive motor 28Y of the "Y" carriage is carried by the guide 24Y of the latter and drives a lead screw 30Y which meshes with a nut 31Y which is part of the "Y" carriage.

Similarly, the drive motor 28X of the "X" carriage is carried by the guide 24X of the latter and drives a lead screw 30X which meshes with a nut 31X that is part of the "X" carriage.

The corresponding arrangements will not be described in more detail here as they will be obvious to those skilled in the art.

Also, alternative arrangements can be adopted.

The drive motor 28Y of the "Y" carriage is an electric motor. Associated with the "Y" carriage is an auxiliary carriage 33Y which is mounted to move to-and-fro parallel to the "Y" carriage. It is through the intermediary of this auxiliary carriage 33Y that the drive motor 28Y operates on the feeler 16, the corresponding floating mounting 29Y being provided between the auxiliary carriage 33Y and the "Y" carriage. The electrical supply to the drive motor 28Y is conditioned by sensing means which, as will be described in more detail later, are responsive to relative movement between the auxiliary carriage 33Y and the "Y" carriage.

Similarly, the drive motor 28X of the "X" carriage is an electric motor and associated with the "X" carriage is an auxiliary carriage 33X which is mounted to move to-and-fro parallel to the "X" carriage. It is through the intermediary of the auxiliary carriage 33X that the drive motor 28X operates on the feeler 16, the corresponding floating mounting 29X being provided between the auxiliary carriage 33X and the "X" carriage. The electrical supply to the drive motor 28X is conditioned by sensing means responsive to relative movement between the auxiliary carriage 33X and the "X" carriage.

As will be described in more detail later, the auxiliary carriage 33Y associated with the "Y" carriage carries the feeler 16 and constitutes a first body which is suspended from a second body constituting the auxiliary carriage 33X associated with the "X" carriage by spring means which provide the corresponding floating mounting 29Y.

This second body is in turn suspended from a cradle 34 which is part of the "Y" carriage by spring means which provide the corresponding floating mounting 29X.

Thus running from the "Y" carriage to the feeler 16 there are, successively nested one within the other, the cradle 34, a body constituting the auxiliary carriage 33Y, the "Y" carriage carrying the entire system through the intermediary of the cradle 34.

The cradle 34 is generally U-shaped with a central base part 36 which is largely open. It is attached to the "Y" carriage by screws (not shown) and its lateral branches 38 are each extended at each end by lugs 39 which all have a right-angle tab directed transversely outwards at the same level.

A cover 41 is attached to the right-angle tabs 40 of the cradle 34, parallel to and immediately below the front plate 14 of the housing 13. It comprises an opening 42 which is much smaller than the opening 15 in the front plate 14, to allow the feeler 16 to pass through. It is designed to close off most of the opening 15 as the feeler 16 moves around in it.

For reasons that will emerge later, one of the lateral branches 38 of the cradle 34 has a lug 43X in its central part, halfway up, projecting outwardly at right angles, parallel to the guide 24X of the "X" carriage.

Similarly, a lug 43Y projects at right angles from the middle part of a right-angle tab 45 of the base part 36 of the cradle 34, parallel to the guide 24Y of the "Y" carriage.

The auxiliary carriage 33X associated with the "X" carriage is generally box-shaped with the longer dimension parallel to the guide 24Y of the "Y" carriage. It lies between the lateral branches 38 of the cradle 34 with its bottom 46 towards the "Y" carriage. The bottom 46 comprises several openings. The auxiliary carriage 33X has longitudinal walls 47 parallel to the guide 24Y and transverse walls 48 parallel to the guide 24X of the "X" carriage.

For reasons that will emerge later, the longitudinal wall 47 of the auxiliary carriage 33X which is on the same side as the lug 43X of the cradle 34 has a lug 49X projecting from it at right angles, over and substantially parallel to the lug 43X.

The auxiliary carriage 33Y associated with the "Y" carriage is disposed inside the auxiliary carriage 33X and has the general shape of an elongate frame, with longitudinal walls 50 and transverse walls 52.

For reasons that will emerge later, the transverse wall 52 on the same side as the lug 43Y on the cradle 34 has in its middle part a lug 49Y projecting outwardly from it at right angles, extending beyond the corresponding transverse wall 48 of the auxiliary carriage 33X, over at least part of the lug 433Y and parallel to the latter.

The spring means providing the floating mountings 29X, 29Y comprise two linear springs 53X, 53Y disposed on opposite sides of the auxiliary carriage 33X, 33Y, aligned with each other and parallel to the guide 24X, 24Y of the "X", "Y" carriage.

Each of the linear springs 53X, 53Y is a V-shape leaf spring with its edge perpendicular to the guide 24X, 24Y of the "X", "Y" carriage and its branches respectively attached by nuts and bolts 55 to the parts concerned in the corresponding floating mounting 29X, 29Y.

There is therefore between each of the longitudinal walls 47 of the auxiliary carriage 33X and the corresponding lateral branch 38 of the cradle 34 a linear spring 53X and between each of the transverse walls 52 of the auxiliary carriage 33Y and the corresponding transverse wall 48 of the auxiliary carriage 33X a linear spring 43Y.

If required, the lateral branches of the linear springs 53X, 53Y may be more or less curved from their common edge.

The sensing means responsive to relative movement between the auxiliary carriage 33X, 33Y and the corresponding "X", "Y" carriage comprise a potentiometer 56X, 56Y operative between the corresponding lug 43X, 43Y on the cradle 34 and the lug 49X, 49Y on the auxiliary carriage 33X, 33Y.

Each of the potentiometers 56X, 56Y has a support 57 fixed to the corresponding lug 43X, 43Y of the cradle 34. It has two tracks and a cursor 58 which is fixed to the lug 49X, 49Y of the corresponding auxiliary carriage 33X, 33Y and which has two fingers bearing on the aforementioned two tracks.

As previously stated, the auxiliary carriage 33Y associated with the "Y" carriage carries the feeler 16.

It does so through the intermediary of a deformable parallelogram linkage with unequal length arms. The deformable parallelogram linkage comprises a plate 60 in which is an opening 61 for the feeler 16 to pass through and which is articulated at one end by lugs 62 to the upper part of the auxiliary carriage 33Y, its other end being articulated by a pivot pin 63 to the encoder 22 carrying the feeler 16. The deformable parallelogram linkage further comprises two links 65 articulated at one end to lugs 66 provided for this purpose on the upper part of the auxiliary carriage 33Y and articulated at their other end by a pivot pin 67 to the tail 23 which is part of the encoder 22.

The distance D1 between the articulation axes on the plate 60 is greater than that D2 between the articulation axes of the links 65.

These articulation axes are all parallel to each other and parallel to the plane in which the "X" and "Y" carriages move (in actual fact, the two carriages move in spaced parallel planes). Because of the unequal length arm deformable parallelogram linkage, sometimes referred to as a Watt parallelogram, movement of the feeler 16 perpendicularly to the aforementioned plane is virtually linear.

Balancing spring means providing a spring-loaded mount for the feeler 16 are provided between it and the auxiliary carriage 33Y which carries it.

These balancing spring means consist of a helical coil spring 69 coupled to the feeler 16 at one end, to be more precise to the tail 23 of the encoder 22 carrying the feeler 16, and coupled at the other end to a plate 70 on the auxiliary carriage 33Y, the position of which plate on which carriage is adjustable substantially parallel to the axis of the feeler 16.

For the purpose of adjusting its position, the plate 70 is attached to a bush 71 forming a nut meshing with a lead screw 72 which passes through the plate 60 by means of an opening 73 in the latter and comprises, beyond the plate 60, a head 74 by means of which it is mounted to rotate on a lug 75 formed from and perpendicular to one of the longitudinal walls 50 of the auxiliary carriage 33Y.

As the head 74 of the lead screw 72 is rotated, the plate 70 moves up or down, altering the tension in the spring 69.

By adjusting this tension the feeler 16 can be equilibrated in virtually any position.

By virtue of the arrangements described so far, and as schematically represented by arrows X, Y in FIG. 2, the cradle 34 which indirectly carries the feeler 16 and therefore the feeler 16 itself are movable in two orthogonal directions X, Y by the corresponding drive motors 28X, 28Y.

Along one edge of the front plate 14 of the housing 13 is a transverse projecting box member 79 which carries in a cruciform arrangement four control pushbuttons 77X+, 77X−, 77Y+, 77Y− accessible to the user. These pushbuttons cause the drive motors 28X, 28Y to rotate in one sense or the other and thus to move the cradle 34 carrying the feeler 16 in one sense or the other along the X axis or along the Y axis.

Each of the "X" and "Y" carriages is associated with means for producing information indicative of its movement.

A particularly simple way to achieve this is for the drive motors 28X, 28Y to be of the kind comprising an integrated rotational encoder.

As an alternative to this, however, separate encoders may be directly associated with the "X" and "Y" carriages.

Encoders of this kind could mesh with racks attached to the carriages, for example.

In any event, two pieces of information are thus provided for each of the "X" and "Y" carriages, one for movement in each sense in the corresponding X or Y direction.

Independently of but conjointly with the movements just described, the auxiliary carriage 33Y carrying the feeler 16 directly and therefore the feeler 16 itself are also movable in either sense along either of the aforementioned two orthogonal directions X and Y, relative to the cradle 34 and thus relative to the "X" and "Y" carriages, within limits set by the corresponding floating mountings 29X, 29Y.

The corresponding displacement information is provided by the corresponding potentiometers 56X, 56Y.

The information on displacement and therefore on position obtained in this way is processed by a control unit (not shown) within the housing 13. As this does not form any part of the present invention, it will not be described here.

Suffice to say that the control unit automatically drives one or both the drive motors 28X, 28Y in one sense or the other so as to move one or both of the "X" and "Y" carriages in one sense or the other, so as to enable the feeler 16 to follow any contour, in particular that of a ring or surround 10 of an eyeglass frame 11, as shown schematically in FIG. 2.

For example, the floating mountings 29X, 29Y employed make it possible to obtain a continuous indication of the magnitude and direction of the components in the X and Y directions of the force with which the feeler 16 is applied against the contour. The control unit computes from these two components of force two components of displacement, one normal to the contour and the other perpendicular to it.

According to whether the application force is too high or too low, the component of displacement normal to the contour corresponds to movement away from or movement towards the contour.

If the application force is equal to the set maximum force then the feeler 16 does not move.

The tangential component of displacement serves to move the feeler 16 along the contour concerned.

The control unit adds these two components of displacement in order to generate regular movement of the feeler 16 slaved to the contour that it is to read combined with regular movement along that contour.

This being the case, all that the operator has to do is to fit the ring or surround 10 of the eyeglass frame 11 concerned that is to be read over the feeler 16, as schematically represented in full outline in FIG. 2, and then to press one of the control pushbuttons 77X+, 77X−, 77Y+, 77Y− to bring the feeler 16 into contact with the ring or surround 10, at any point thereon, as schematically represented in chain-dotted outline at $16_1$ in FIG. 2. Finally, the operator initiates the working cycle by pressing another control pushbutton 80 on the box member 79 of the frame 13.

Following this initialization, and controlled by the control unit provided for this purpose, the feeler 16 then of its own accord follows the contour of the ring or surround 10 concerned, as schematically represented in chain-dotted outline at $16_2$, $16_3$, $16_4$ in FIG. 2.

The arrangement is such that the force with which the feeler 16 is initially applied to the ring or surround 10 has no effect on subsequent operations.

Figure 7:
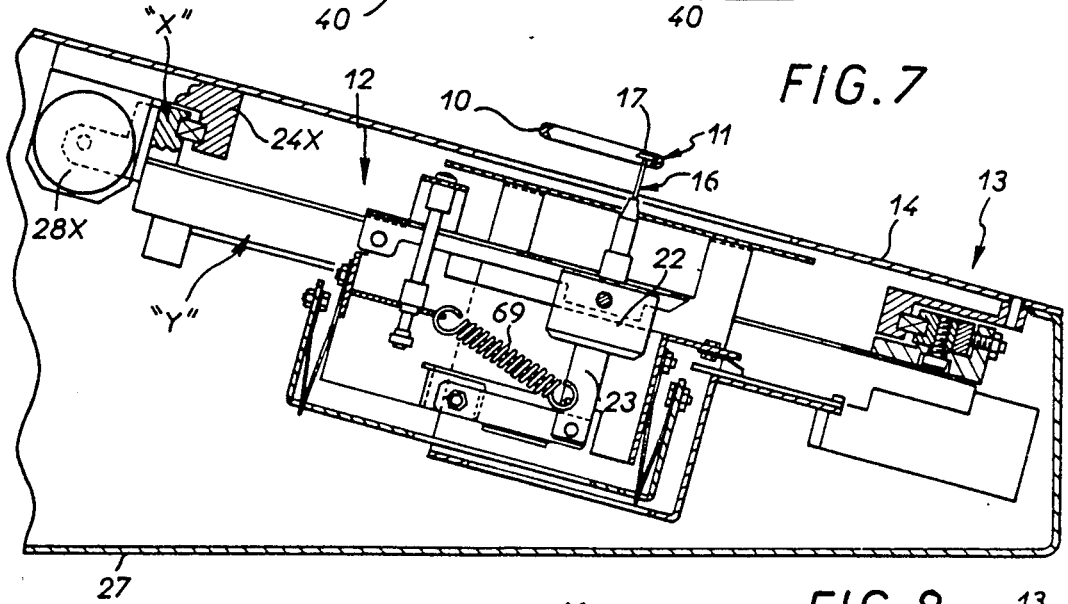
FIGS. 7 and 8 are cross-section views to a different scale and respectively analogous to those of FIGS. 3 and 4, relating to an alternative embodiment.
Figure 8:
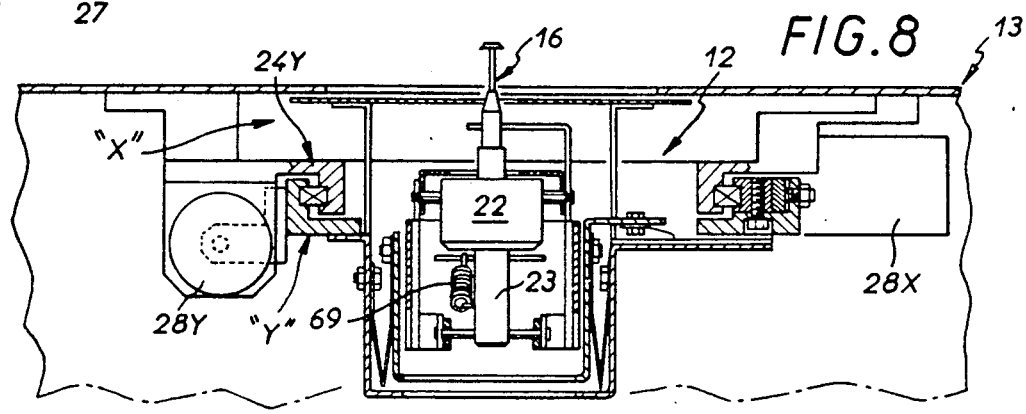

In the alternative embodiment shown in FIGS. 7 and 8 the contour reading device 12 in accordance with the invention, taken as a whole, is suspended from the guide 24X of the "X" carriage, the guide 24X being disposed at the top and attached to the front plate 14 of the housing 13.

Being free at the bottom and relatively insensitive to the force of gravity, the contour reading device 12 in accordance with the invention may advantageously be inclined relative to the base 27 of its housing 13.

The same goes for its front plate 14.

The present invention is not limited to the embodiments described and shown, but encompasses any variant execution thereof.

Furthermore, its applications are not limited to reading concave contours, as is the case with the contours of the rings or surrounds of an eyeglass frame.

It can equally well be used to read a convex contour, such as those of corresponding templates or of the lenses themselves when it is a question of replacing a lens.

More generally, the field of application of the invention encompasses reading the contour of any article.

There is claimed:

1. Device for reading closed contours of articles, comprising a feeler adapted to continuously bear against and move with respect to an article to read its closed contour, a first carriage supporting said feeler, a guide guiding said first carriage for to-and-fro movement, a drive motor means for moving said first carriage on said guide, an auxiliary carriage associated with said first carriage and mounted for to-and-fro movement parallel to said first carriage, resilient means for floatingly mounting said auxiliary carriage relative to said first carriage and permitting limited movement in opposed directions, sensing means responsive to relative movement between said auxiliary carriage and said first carriage, said drive motor means effecting displacement of said feeler in bearing contact with the articles through said first carriage and said auxiliary carriage, said sensing means operably connected to said drive motor means for controlling the displacement of said feeler and for maintaining said feeler in bearing contact with an article in response to the relative movement between said auxiliary carriage and said first carriage.

2. Device according to claim 1, wherein said auxiliary carriage carries said feeler.

3. Device according to claim 1, further comprising a deformable parallelogram linkage carried by said auxiliary carriage, said linkage having arms of unequal length and carrying said feeler, and balancing spring means operatively disposed between said auxiliary carriage and said feeler and defining a spring-loaded mount for said feeler.

4. Device according to claim 3, the feeler having an axis and further comprising a plate adjustably mounted on said auxiliary carriage in a direction substantially parallel to the axis of said feeler, said balancing spring means having respective ends coupled to said feeler and said plate.

5. Device according to claim 2, wherein said resilient means floatingly mounting said auxiliary carriage relative to said first carriage is connected between said auxiliary carriage and a body carried by said first carriage whereby said auxiliary carriage is suspended from said body.

6. Device according to claim 1, wherein said drive motor means is connected to said first carriage through a lead screw meshing with a nut, said drive motor means being carried by said guide.

7. Device according to claim 1, wherein said sensing means comprises a potentiometer.

8. Device according to claim 1, wherein said drive motor means comprises an integral rotation encoder.

9. Device according to claim 5, wherein said resilient means comprises two linear springs disposed on opposite sides of said auxiliary carriage, said two linear springs being aligned with each other and parallel to said guide.

10. Device according to claim 9, wherein each of said linear springs comprises a V-shape leaf spring having two branches, one branch of each spring being attached to said auxiliary carriage and the other end to said body.

11. Device for reading closed contours of articles such as eyeglass frame surrounds, comprising a feeler adapted to continuously bear against and move with respect to an article to read its closed contour, a first carriage, a first guide guiding said first carriage for to-and-fro movement, a first drive motor means for moving said first carriage on said first guide, a first auxiliary carriage carrying said feeler and associated with said first carriage mounted for to-and-fro movement parallel to said first carriage, resilient means for floatingly mounting said first auxiliary carriage relative to said first carriage and permitting limited movement in first opposed directions, said first drive motor means effecting movement of said feeler through said first carriage and said first auxiliary carriage, first sensing means responsive to relative movement between said first carriage and said first auxiliary carriage, a second carriage, a second guide substantially perpendicular to said first guide for guiding said second carriage for to-and-fro movement, second drive motor means for moving said second carriage on said second guide, a second auxiliary carriage associated with said second carriage mounted for to-and-fro movement parallel to said second carriage, resilient means for floatingly mounting said second auxiliary carriage relative to said second carriage and permitting limited movement in second opposed directions perpendicular to said first opposed directions, said second auxiliary carriage being operably connected to said first auxiliary carriage, said second drive motor means effecting movement of said feeler through said second carriage and said second and first auxiliary carriages, second sensing means responsive to relative movement between said second carriage and said second auxiliary carriage, said first and second sensing means being coupled to the respective first and second drive motor means for controlling the displacement of said feeler and for maintaining said feeler in bearing contact with an article in response to the relative movement between said first carriage and said first auxiliary carriage and said second carriage and said second auxiliary carriage respectively.

12. Device according to claim 11, wherein said first auxiliary carriage is suspended from said second auxiliary carriage by said first resilient means, a cradle fixed to said first carriage, said second resilient means being operatively connected between said cradle and said second auxiliary carriage thereby suspending said second auxiliary carriage from said cradle.

13. Device according to claim 11, wherein said first and second drive motor means are connected to their respective first and second carriages through first and second lead screws meshing with respective first and second nuts, said first and second drive motor means being carried by said respective first and second guides.

14. Device according to claim 12, wherein said resilient means each comprises two linear springs disposed on opposite sides of said respective first and second carriages, the linear springs of each auxiliary carriage being aligned with each other and parallel to the respective guide.

15. Device according to claim 14, wherein each of said linear springs comprises a V-shape leaf spring having two branches, each of the V-shape leaf springs being attached at the ends of their branches to said cradle and a respective one of said first and second auxiliary carriages.

16. Device according to claim 12, wherein said sensing means comprise respective first and second potentiometers, said first potentiometer being connected between said first auxiliary carriage and said cradle, said second potentiometer being connected between said second auxiliary carriage and said cradle.

17. Device according to claim 11, wherein a housing encloses the device, said housing has a base, and said second guide is attached to said housing base.

18. Device according to claim 11, wherein a housing including a top encloses the device, said housing has a front plate at said top thereof, and said second guide is attached to said front plate.

19. Combination according to claim 18, wherein said housing has a base, and the device is inclined relative to said housing base.

20. Device according to claim 17, wherein said drive motor means includes respective integral rotation encoders.

* * * * *